United States Patent
Jordan

(10) Patent No.: US 12,419,300 B2
(45) Date of Patent: Sep. 23, 2025

(54) SYSTEMS AND METHODS REMOTELY MONITORING AND ACTUATING TRAP STRUCTURES

(71) Applicant: SJB OPERATING LLC, Bloomfield, NM (US)

(72) Inventor: Robert A. Jordan, Bloomfield, NM (US)

(*) Notice: Subject to any disclaimer, the term of this patent is extended or adjusted under 35 U.S.C. 154(b) by 121 days.

(21) Appl. No.: 18/449,269

(22) Filed: Aug. 14, 2023

(65) Prior Publication Data

US 2023/0389535 A1 Dec. 7, 2023

Related U.S. Application Data

(63) Continuation-in-part of application No. 17/333,807, filed on May 28, 2021, now Pat. No. 11,758,897.

(60) Provisional application No. 63/031,068, filed on May 28, 2020.

(51) Int. Cl.
| | |
|---|---|
| *A01M 23/02* | (2006.01) |
| *A01K 1/00* | (2006.01) |
| *A01M 31/00* | (2006.01) |
| *G01P 13/00* | (2006.01) |

(52) U.S. Cl.
CPC .......... *A01M 23/02* (2013.01); *A01K 1/0017* (2013.01); *A01M 31/002* (2013.01); *G01P 13/00* (2013.01)

(58) Field of Classification Search
CPC .... A01M 31/002; A01M 23/02; A01M 23/08; A01M 23/24; A01K 1/0005; A01K 1/0035; A01K 1/02; A01K 1/0011; A01K 1/0017; A01K 1/0023; A01K 1/0029; E05B 47/0001; E05B 47/0002; E05F 1/08
See application file for complete search history.

(56) References Cited

U.S. PATENT DOCUMENTS

| | | | |
|---|---|---|---|
| 3,545,407 A | 12/1970 | Moore | |
| 8,359,783 B1* | 1/2013 | Kamery | A01M 23/00 43/61 |
| 9,439,412 B2* | 9/2016 | Kittelson | A01M 23/20 |
| 9,814,228 B2 | 11/2017 | Pinkston et al. | |
| 10,098,339 B2 | 10/2018 | Pinkston et al. | |
| 2009/0013587 A1* | 1/2009 | Wetzel | A01M 23/38 43/98 |
| 2009/0307961 A1* | 12/2009 | Walter | A01M 23/00 43/61 |
| 2014/0261234 A1 | 9/2014 | Gillis et al. | |

(Continued)

*Primary Examiner* — Joshua J Michener
*Assistant Examiner* — Henry Hooper Mudd
(74) *Attorney, Agent, or Firm* — Aurora Consulting LLC; Ashley Sloat

(57) ABSTRACT

A control system may include a processor, a power source, optionally an antenna, optionally a communication device, optionally one or more cameras, one or more motion sensors, and optionally one or more electromechanical latches. The one or more motion sensors are configured to create signals indicative of one or both of: a presence of a target animal, or a direction of travel of an animal, wherein the processor is configured to process the signals indicative of one or both of: a presence of the target animal, or the direction of travel of an animal, and wherein the system is configured to output an actuation signal to actuate closure of one or more containments of a remote trap structure based on one or both of: the determined presence of the animal, or the determined direction of travel of the animal.

18 Claims, 14 Drawing Sheets

(56) References Cited

U.S. PATENT DOCUMENTS

| | | |
|---|---|---|
| 2015/0296766 A1* | 10/2015 | Gaskamp .............. A01M 23/22 |
| 2018/0064094 A1 | 3/2018 | Cantrell et al. |
| 2018/0077919 A1* | 3/2018 | McNew ................ A01M 23/20 |
| 2018/0249701 A1 | 9/2018 | Sponholz, III |
| 2019/0098874 A1 | 4/2019 | Burton |
| 2020/0267515 A1* | 8/2020 | Stapleford .............. H04W 4/38 |

* cited by examiner

SYSTEMS AND METHODS REMOTELY MONITORING AND ACTUATING TRAP STRUCTURES

CROSS-REFERENCE TO RELATED APPLICATIONS

This application is a continuation-in-part of U.S. Nonprovisional patent application Ser. No. 17/333,807, filed May 28, 2021; which claims the priority benefit of U.S. Provisional Patent Application Ser. No. 63/031,068, filed on May 28, 2020; the contents of each are herein incorporated by reference in their entirety.

INCORPORATION BY REFERENCE

All publications and patent applications mentioned in this specification are herein incorporated by reference in their entirety, as if each individual publication or patent application was specifically and individually indicated to be incorporated by reference in its entirety.

TECHNICAL FIELD

This disclosure relates generally to the field of animal trapping, and more specifically to the field of monitoring and actuating traps remotely. Described herein are systems and methods for monitoring and actuating traps remotely.

BACKGROUND

Animal species such as wild horses, wild hogs and many other prolific wildlife can cause significant damage to agriculture when over-population occurs. Rural areas experiencing overpopulation of wild horses can encounter overgrazing damage and direct competition between said horses and domestic livestock herds, causing economic losses to local farmers and ranchers. Furthermore, habitat crucial to the sustainment and conservation of local wildlife can be directly impacted by unbalanced wild horse populations, causing the deterioration of said wildlife herds, especially in times of drought.

A solution to the local impacts of over-populated wild horse herds must be economic as well as humane. The solution, championed by most, is the trapping and the relocation of said animals.

Suitable trapping systems must be easily transported and easily assembled due to the remoteness of most installations and frequency of relocation. In addition, trapping control systems must be reliable even the remote sites.

Accordingly, there exists a need to develop new control systems for the monitoring and actuation of trap systems.

SUMMARY

In some aspects, the techniques described herein relate to a remote trap monitoring and actuation system, including: a power source; one or more motion sensors; and a processor and a memory configured to store instructions, wherein the processor is communicatively coupled to the memory, the power source, and the one or more motion sensors, wherein the instructions, when executed by the processor, cause the processor to; receive one or more signals, from the one or more motion sensors, process the one or more signals to determine one or both of: a presence of an animal, or a direction of travel of the animal, and output an actuation signal to actuate closure of one or more containments of a trap structure based on one or both of: the determined presence of the animal, or the determined direction of travel of the animal.

In some aspects, the techniques described herein relate to a system, further including: an antenna; and a communication device.

In some aspects, the techniques described herein relate to a system, wherein the instructions, when executed by the processor, cause the processor to transmit instructions to a computing device and process instructions received from the computing device.

In some aspects, the techniques described herein relate to a system, wherein the instructions, when executed by the processor, cause the processor to transmit notification instructions to the computing device upon processing signals from the one or more motion sensors indicative of one or both of: the presence of the animal, or a predefined direction of travel of the animal.

In some aspects, the techniques described herein relate to a system, further including an erectable tower, wherein the antenna is coupled to the erectable tower.

In some aspects, the techniques described herein relate to a system, further including a trailer, wherein the system is transferred within the trailer and deployed from the trailer.

In some aspects, the techniques described herein relate to a system, further including one or more electromechanical latches, wherein the one or more electromechanical latches are configured to be installed on one or more respective gate apertures of a containment structure, wherein: in an unactuated state, the one or more electromechanical latches are configured to hold a respective gate open, biased towards a closed position, and in an actuated state, the one or more electromechanical latches are configured to release the respective gate, allowing the respective gate to travel to the closed position.

In some aspects, the techniques described herein relate to a system, wherein the one or more motions sensors include a first motion sensor and a second motion sensor, wherein the first motion sensor is configured to be installed near or on a first gate aperture of a containment structure and the second motion sensor is configured to be installed near or on a second gate of the containment structure.

In some aspects, the techniques described herein relate to a system, wherein the one or more motion sensors include a first pair of motion sensors and a second pair of motion sensor, wherein the first pair of motion sensors are configured to be installed near or across a first gate aperture of a containment structure and the second pair of motion sensors are configured to be installed near or across a second gate aperture of the containment structure.

In some aspects, the techniques described herein relate to a system, further including a trap structure that includes: a first plurality of panels configured to define an outer perimeter and an outer containment, wherein the first plurality of panels includes a first gate; and a second plurality of panels configured to define an inner perimeter and an inner containment, wherein the inner perimeter includes a second gate, wherein the first gate and second gate are configured to be activated to move between an open position and a closed position, and wherein, when the first gate and the second gate are activated to the closed position, the inner containment is independent of the outer containment, such that the second plurality of panels do not contact the first plurality of panels.

In some aspects, the techniques described herein relate to a computer-implemented method of remotely monitoring and actuating a trap structure, including: receiving one or more signals from one or both of: one or more cameras, or one or more motion sensors; processing the one or more signals to determine one or both of: a presence of an animal or a direction of travel of an animal; and outputting an actuation signal to actuate closure of one or more containments of a remote trap structure based on one or both of the determined presence of the animal or the determined direction of travel of the animal.

In some aspects, the techniques described herein relate to a method, further including transmitting notification instructions to a computing device.

In some aspects, the techniques described herein relate to a method, further including receiving an input, from the computing device, in response to the transmitted notification.

In some aspects, the techniques described herein relate to a method, further including delaying for a predefined period of time between one or both of: the determination the presence of the animal or the determination of the direction of travel, and outputting an actuation signal to actuate closure of one or more containments of a trap structure.

BRIEF DESCRIPTION OF THE DRAWINGS

The foregoing is a summary, and thus, necessarily limited in detail. The above-mentioned aspects, as well as other aspects, features, and advantages of the present technology are described below in connection with various embodiments, with reference made to the accompanying drawings.

The illustrated embodiments are merely examples and are not intended to limit the disclosure. The schematics are drawn to illustrate features and concepts and are not necessarily drawn to scale.

DETAILED DESCRIPTION

The foregoing is a summary, and thus, necessarily limited in detail. The above-mentioned aspects, as well as other aspects, features, and advantages of the present technology will now be described in connection with various embodiments. The inclusion of the following embodiments is not intended to limit the disclosure to these embodiments, but rather to enable any person skilled in the art to make and use the claimed subject matter. Other embodiments may be utilized, and modifications may be made without departing from the spirit or scope of the subject matter presented herein. Aspects of the disclosure, as described and illustrated herein, can be arranged, combined, modified, and designed in a variety of different formulations, all of which are explicitly contemplated and form part of this disclosure.

The term "communicatively coupled" may be defined as either wireless communication (i.e., wirelessly coupled) between components or a wired connection between components. With regard to wireless communication, this could be, for example, devices communicating with one another through the internet within a coverage area provided by a WiFi® router or more directly with, for example, Bluetooth® transmitter and receiver, or the like.

Example embodiments of a trap structures illustrated are adapted for wild horse trapping and relocation. These adaptations are shown for demonstrative reasons and are not made in such a way to limit said invention to only Equidae trapping. The area inside the inner perimeter will be referred to as the inner containment and the area between the outside of the inner perimeter and the inside of the outer perimeter will be referred to as the outer containment.

Figure 1:
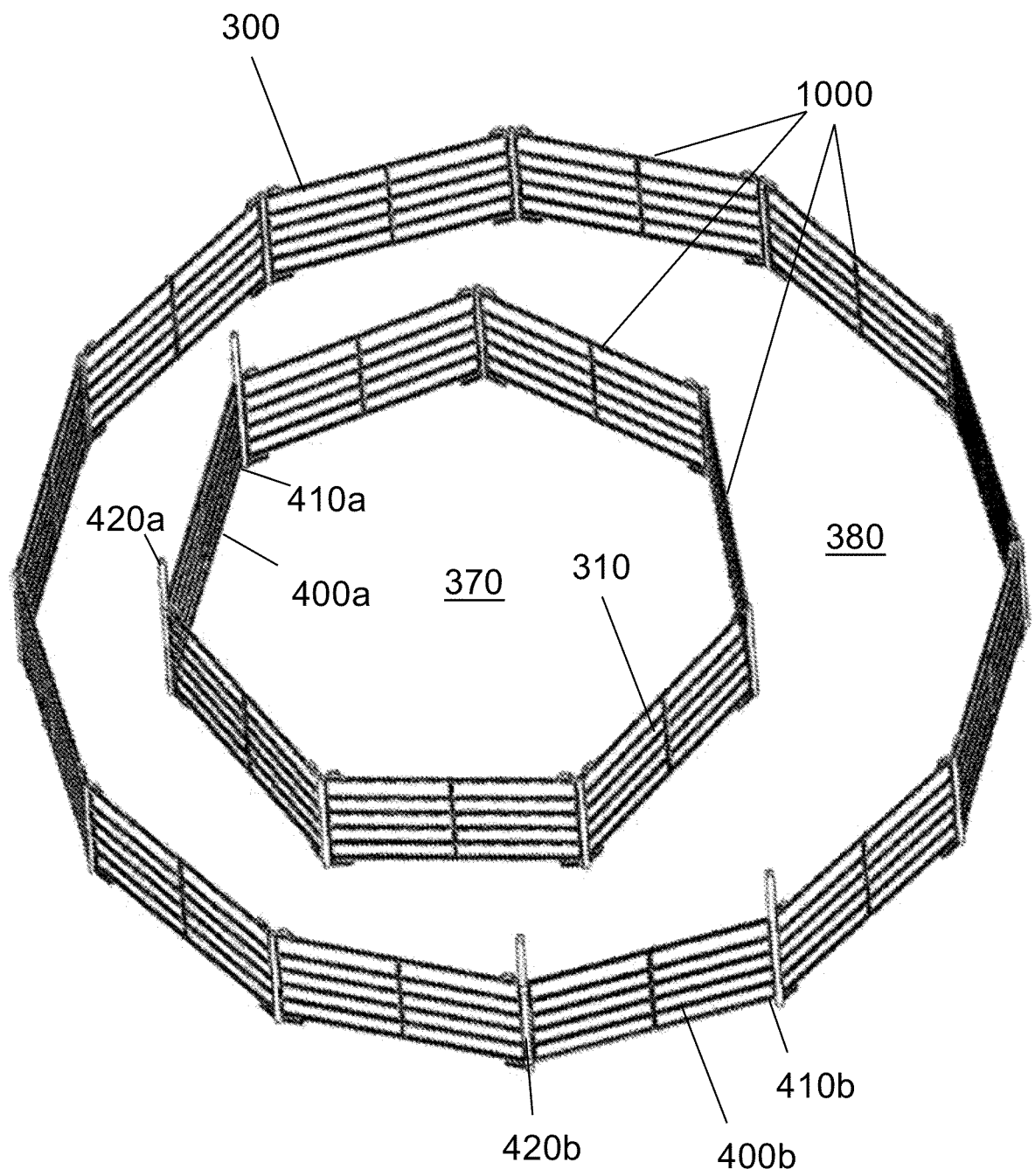
FIG. 1 illustrates a trap structure embodiment with an outer containment and inner containment both closed.
Figure 4:
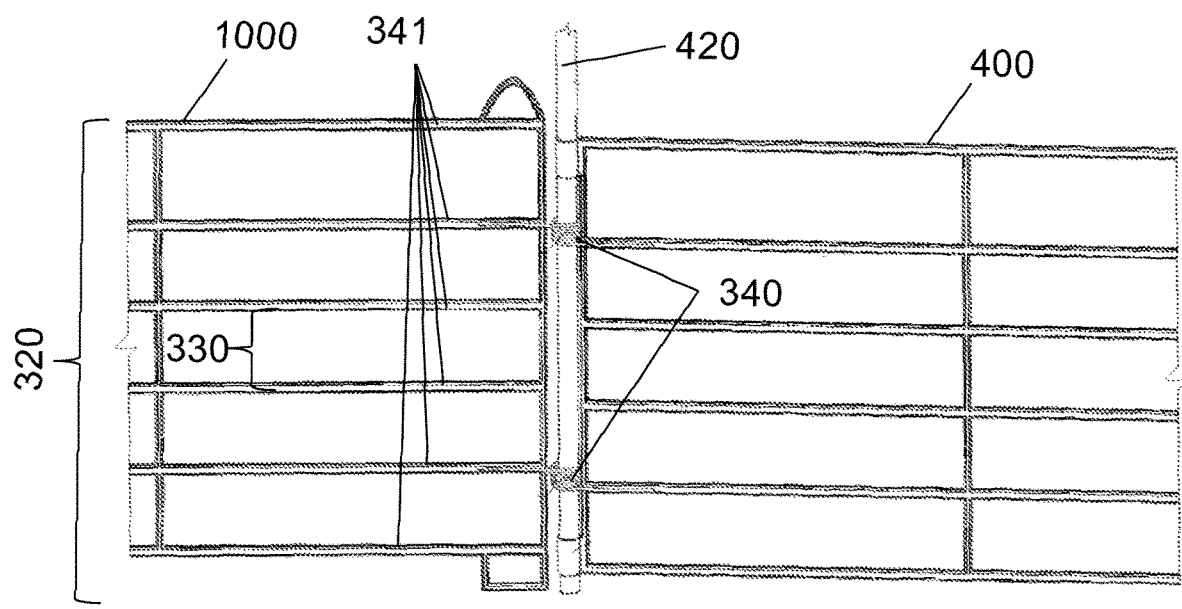
FIG. 4 illustrates bias components capable rotating the gate panel closed.

FIG. 1 illustrates an example embodiment of a trap structure including a first plurality of panels 1000 defining an inner perimeter 310 and a second plurality of panels 1000 defining an outer perimeter 300. Further, the trap structure inner perimeter 310 includes an inner gate panel 400a with a gate post 420a, and the trap structure outer perimeter 300 includes an outer gate panel 400b with gate post 420b. FIG. 1 illustrates the trap structure in which both a first aperture 350 (shown in FIG. 2) and a second aperture 360 (shown in FIG. 2) are closed. In this configuration, the inner containment 370 is independent of the outer containment 380, and outer perimeter 300 does not contact the inner perimeter 310. The inner perimeter 310 includes a first plurality of panels 1000, and the outer perimeter 300 includes a second plurality of panels 1000. Each panel 1000 of the plurality of panels 1000 can be fastened to each other via chains, in a knuckle joint method or any other method known in the art. In some embodiments (shown FIG. 4), at least a subset of the plurality of panels 1000 may include a sufficient height 320 (e.g., about 1.5 m to about 2.5 m) to deter trapped animals from jumping over and sufficiently narrow spacing 330 (e.g., about 20 cm to about cm) between the horizontal members 341 of each panel 1000 to avoid animal attempts to squeeze between. The outer perimeter 300 of the illustration in FIG. 1 is substantially circular, although hexagonal, octagonal, and the like arrangements are also contemplated herein. In some embodiments, the inner perimeter 310 also includes a circular geometry. Substantially circular containments are useful when trapping and handling feral animals from the Equidae species. Such animals can run at high speeds and jump quite well. Once trapped, the anxious animals may begin to run around the inner diameter of either the inner perimeter 310 or the outer perimeter 300 of the containment. If restrictions such as corners were introduced to these paths, they would become a focal point for escape attempts and/or hazards to a running animal. Unlike a single containment area trap, this dual containment also obstructs any contained animals from utilizing an unobstructed path across the containment area, decreasing the odds of an animal gaining enough speed to jump over the outer perimeter 300.

Figure 2:
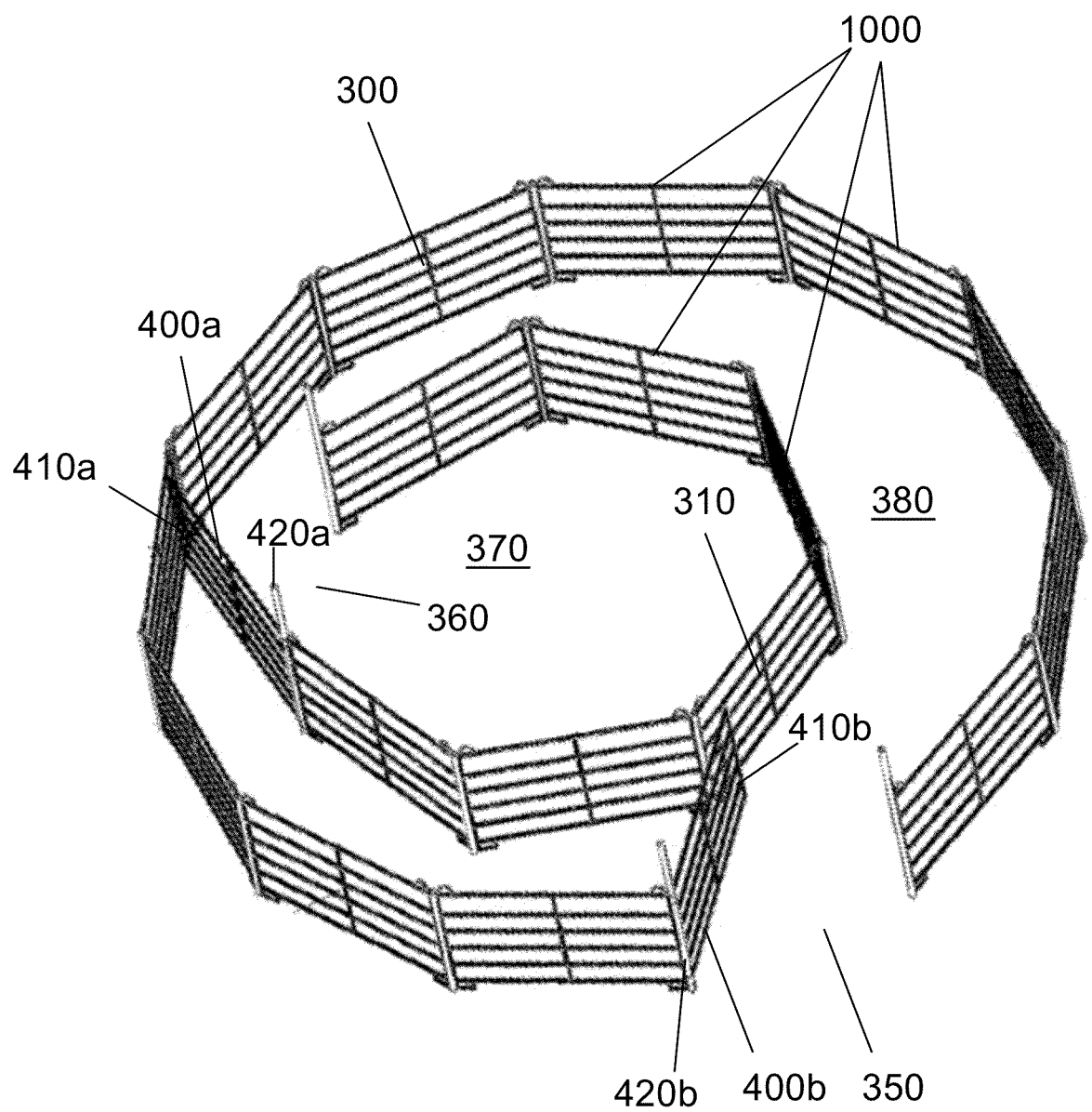
FIG. 2 illustrates a trap structure embodiment with an outer containment and inner containment both open.
Figure 3:
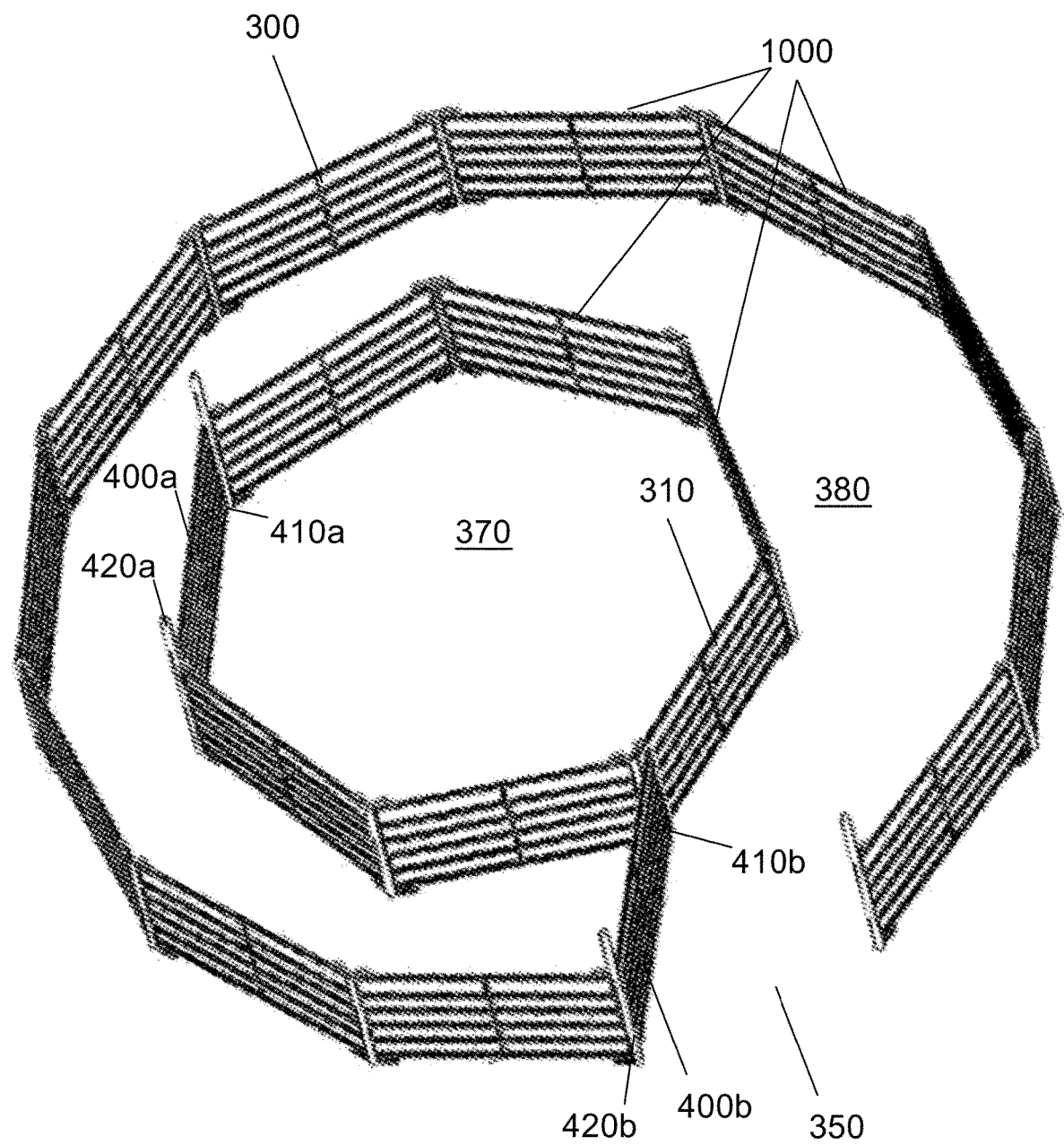
FIG. 3 illustrates a trap structure embodiment with an outer containment open and inner containment closed.

FIG. 2 illustrates a trap structure embodiment with the inner and outer perimeters open, resulting in both the inner containment 370 and outer containment 380 being open. Both the inner containment 370 and outer containment 380 have apertures 350, 360 which allow an animal to pass through or be contained by the inner gate panel 400*a* and the outer gate panel 400*b* based on their position. FIGS. 1, 2 and 3 demonstrate three possible configurations of the trap structure embodiment. As previously described, when dealing with family or social groups, it may be advantageous to trap all members at one time. FIG. 2 shows how the trap structure embodiment may be set with both the inner gate panel 400*a* and the outer gate panel 400*b* open. Feed and/or any other consumables can then be placed inside the inner containment 370 and/or the outer containment 380. It may be advantageous for the targeted animal group to arrive and, as one group, be enticed through the first aperture 350 created by the outer gate panel 400*b*. With one or more animals in the outer containment 380, the outer gate panel 400*b* may be closed, trapping the animal group inside the outer containment 380. The contained animals seeking an escape route or further enticement by consumables, may enter the inner containment 370 through the second aperture 360, allowing the inner gate panel 400*a* to be closed to confine the animals in the smaller and easier to handle inner containment 370.

Other embodiments can be introduced that the multi-containment capability of the trap structures described herein can solve, and which other apparatuses known in the art cannot. Such a scenario could be one in which only part of the animal group enters through the first aperture 350 defined by the outer gate panel 400*b*, perhaps due to leery individuals, leaving several target animals outside of the containment. In such a scenario, the outer gate panel 400*b* is left open allowing the partial group to be enticed further into the trap and eventually into the inner containment 370, at which time the inner gate panel 400*a* can be closed, trapping the partial group inside. Upon initial closing of the inner gate panel 400*a*, the entire group of target animals may be startled but through practice it has been found that the confined target animal group will settle and resume feeding and/or watering. After some time, the excluded animal group, which has not left due to family or social ties, will eventually be enticed through the outer gate panel 400*b*, allowing it to then to be closed, trapping the entire animal group.

Figure 5:
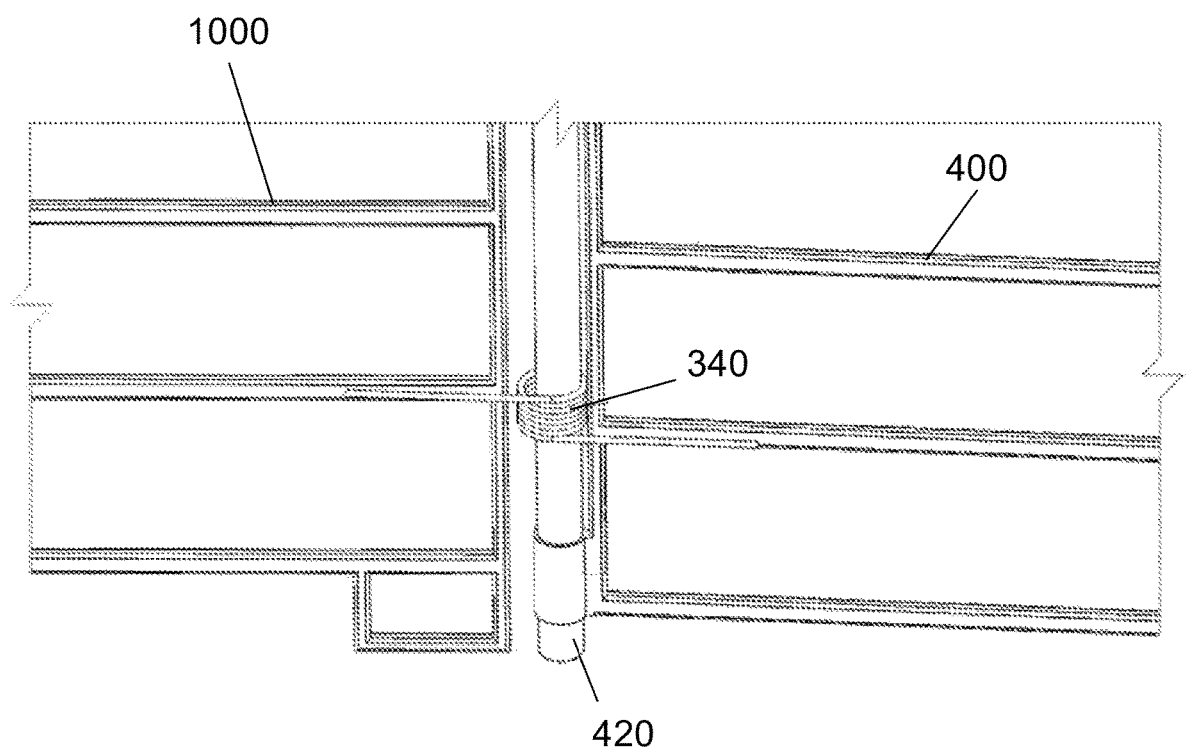
FIG. 5 illustrates a lower bias component capable rotating the gate panel closed.

During the processes described herein, the inner gate panel 400*a* and the outer gate panel 400*b* may be both released and actuated with the same method. When positioning the inner gate panel 400*a* and the outer gate panel 400*b*, they may be pressed toward the open position and in the load direction of a bias component. In the embodiment illustrated in FIGS. 4 and 5, the bias component is shown as torsion spring 340 in FIGS. 4 and 5. In this example embodiment, the torsion spring 340 coupled to a gate post 420 upon which the inner gate panel 400*a* and the outer gate panel 400*b* rotate. When the inner gate panel 400*a* and the outer gate panel 400*b* are rotated into a set position, potential energy is stored in the torsion spring 340, creating a force in the direction of the closed position. The closing force can be created with a multitude of bias devices. For example, a tension spring attached to either the inner gate panel 400*a* or the outer gate panel 400*b* with an appropriate lever arm relative to the axis of rotation, may be capable of creating a moment large enough for closure of either the inner gate panel 400*a* or the outer gate panel 400*b*. In addition, the inner gate panel 400*a* and the outer gate panel 400*b* are not limited to rotate about the gate posts 420*a*, 420*b*. In cases where gate posts are not used, other methods such as a knuckle joints can be used for the pivot point of the inner gate panel 400*a* and the outer gate panel 400*b*.

Figure 6A:
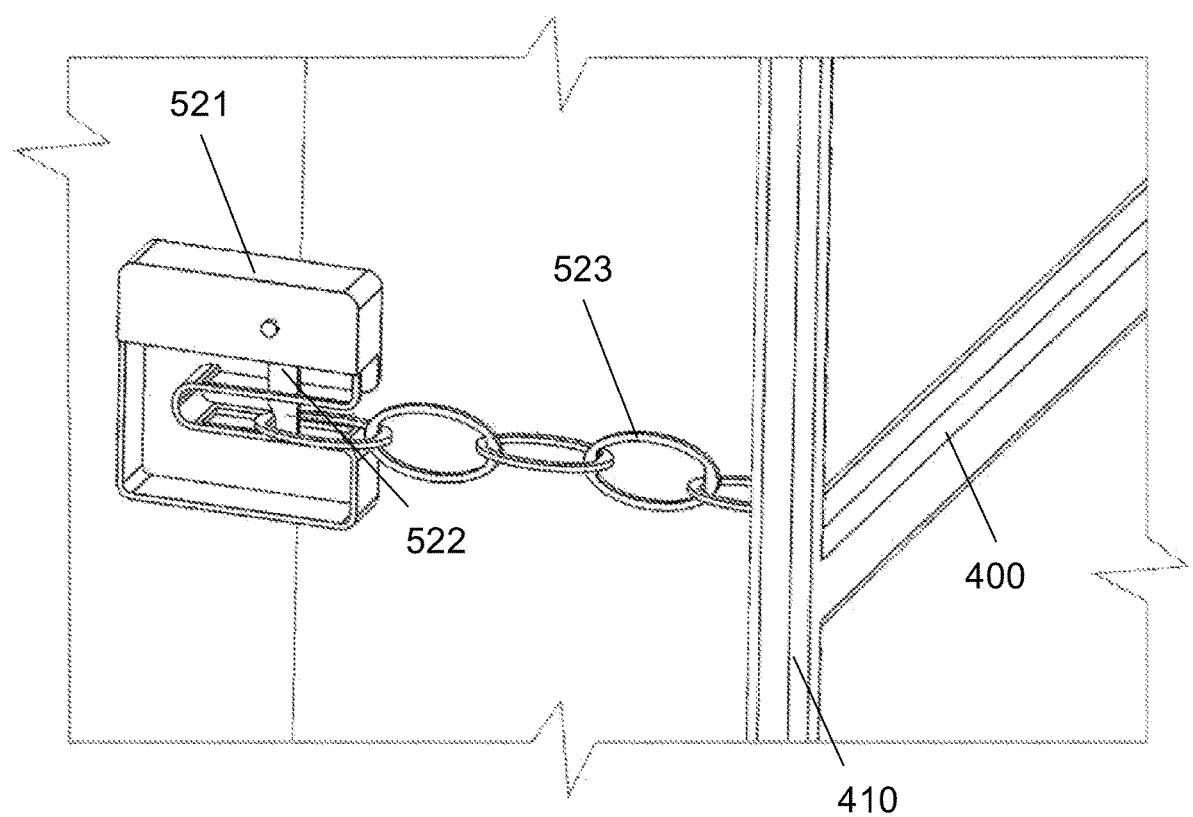
FIG. 6A illustrates an embodiment of an unactuated electromechanical latch, that when actuated allows the gate panel to close.
Figure 6B:
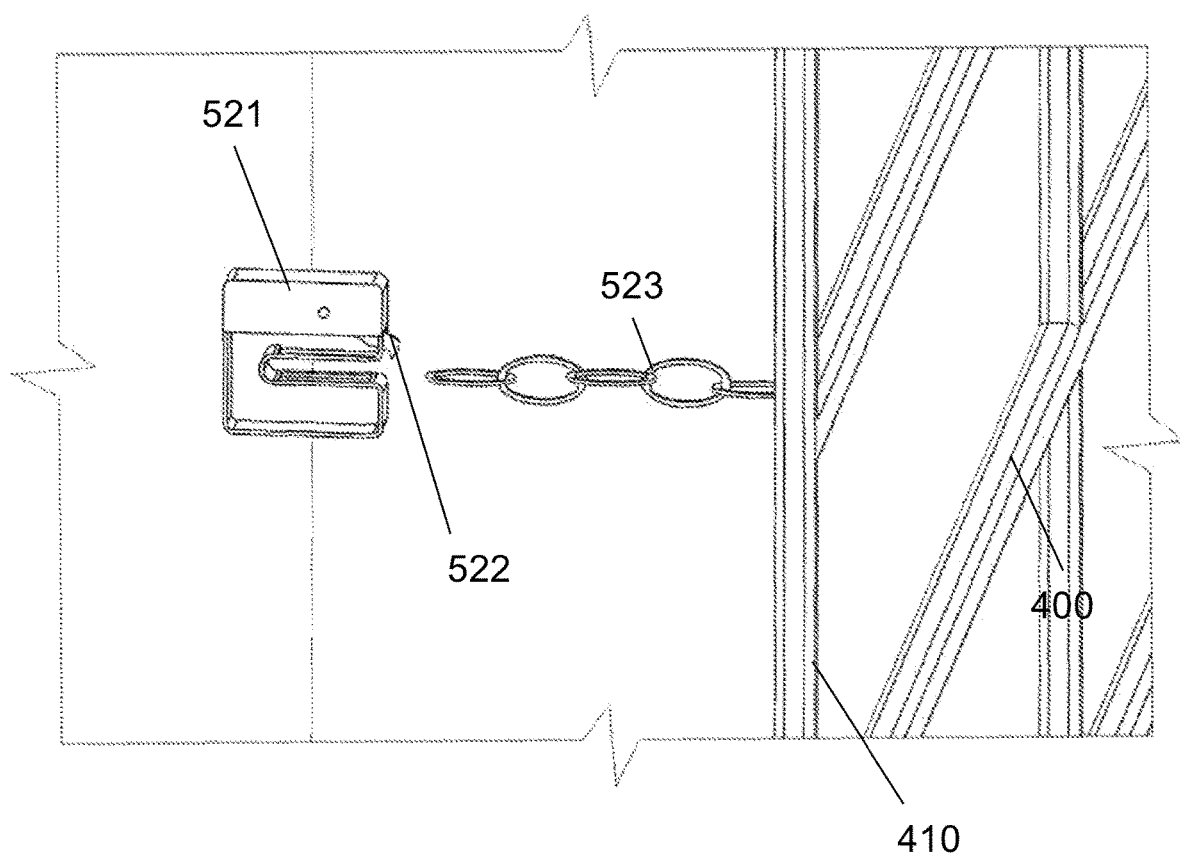
FIG. 6B illustrates an embodiment of an electromechanical latch actuated allowing the gate panel to close.

In some embodiments, the inner gate panel 400*a* and the outer gate panel 400*b* are held in an open position by the electromechanical latch 521. An example of this is illustrated in FIG. 6A, in which the electromechanical latch 521 is mounted on either a post 420 or panel 1000. The illustrated embodiment includes chain 523 to connect either the inner gate panel 400*a* or the outer gate panel 400*b* to the electromechanical latch 521. The chain 523 may be mounted on the free end 410*a* of the inner gate panel 400*a* and on the free end 410*b* of the outer gate panel 400*b* opposing the end of rotation. The chain 523 may be placed in the electromechanical latch 521, in an unactuated state, and held in place by the trigger pin 522, which holds back the inner gate panel 400*a* or the outer gate panel 400*b*. When actuated, the electromechanical latch 521 moves the trigger pin 522 from a latched to unlatched position allowing either the inner gate panel 400*a* or the outer gate panel 400*b* to close, as shown in FIG. 6B.

Figure 7:
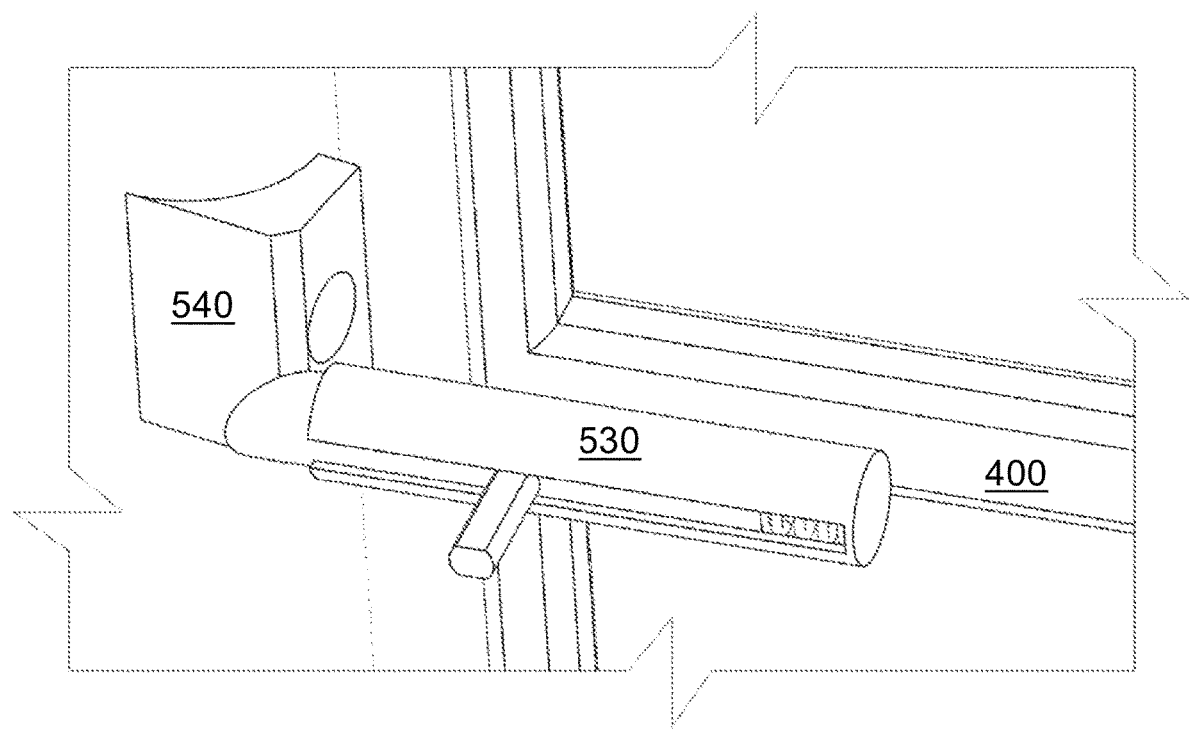
FIG. 7 illustrates an embodiment of a spring-loaded locking pin and a receptacle.

The outer gate panel 400*b* closes to the inside of and contacts the outer perimeter 300 and, thus it may not be crucial for it to lock in position once closed. The outer gate panel 400*b* can include spring-loaded locking pin 530 and locking pin receptacle 540 shown in FIG. 7, but it is not required. The outer gate panel 400*b* can instead utilize the torsion spring 340 to hold outer gate panel 400*b* closed, as long as outer gate panel 400*b* has a rigid stop in the closed position. Animals attempting to escape typically attempt to push and rarely pull, making this construction effective in many instances. The inner gate panel 400*a* closes from the outer perimeter 300 to the inner perimeter 310, making the spring-loaded locking pin 530 and the locking pin receptacle 540 advantageous to negate animal escape attempts. The spring-loaded locking pin 530 is mounted on either the inner gate panel 400*a* and/or the outer gate panel 400*b* on the end 410*a*, 410*b* opposing the end of rotation. When the inner gate panel 400*a* or the outer gate panel 400*b* moves into the closed position, the momentum caused by the rotation forces the engagement side of the spring-loaded locking pin 530 into the engagement side of the locking pin receptacle 540. The engagement causes a force that moves the spring-loaded locking pin 530 back until the tip of the spring-loaded locking pin 530 drops into the depression of the locking pin receptacle 540, locking either the inner gate panel 400*a* or the outer gate panel 400*b* in place.

Figure 8:
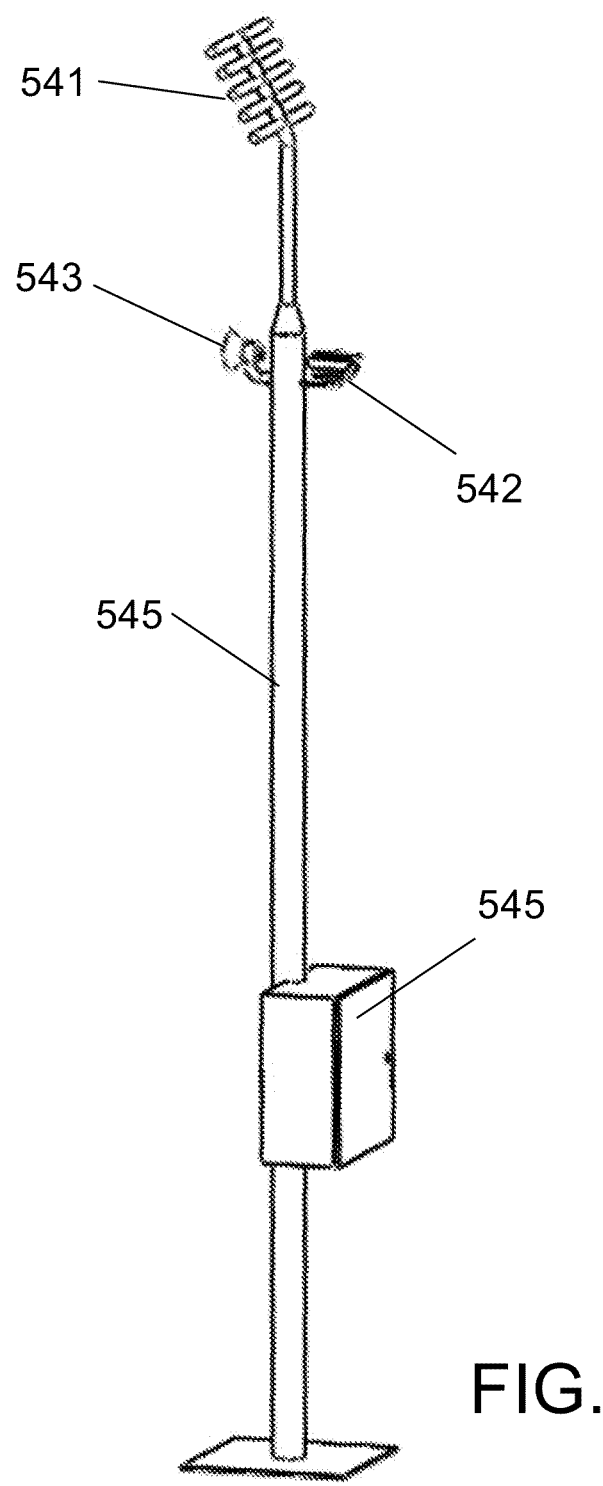
FIG. 8 illustrates a control tower of a control system embodiment.
Figure 9:
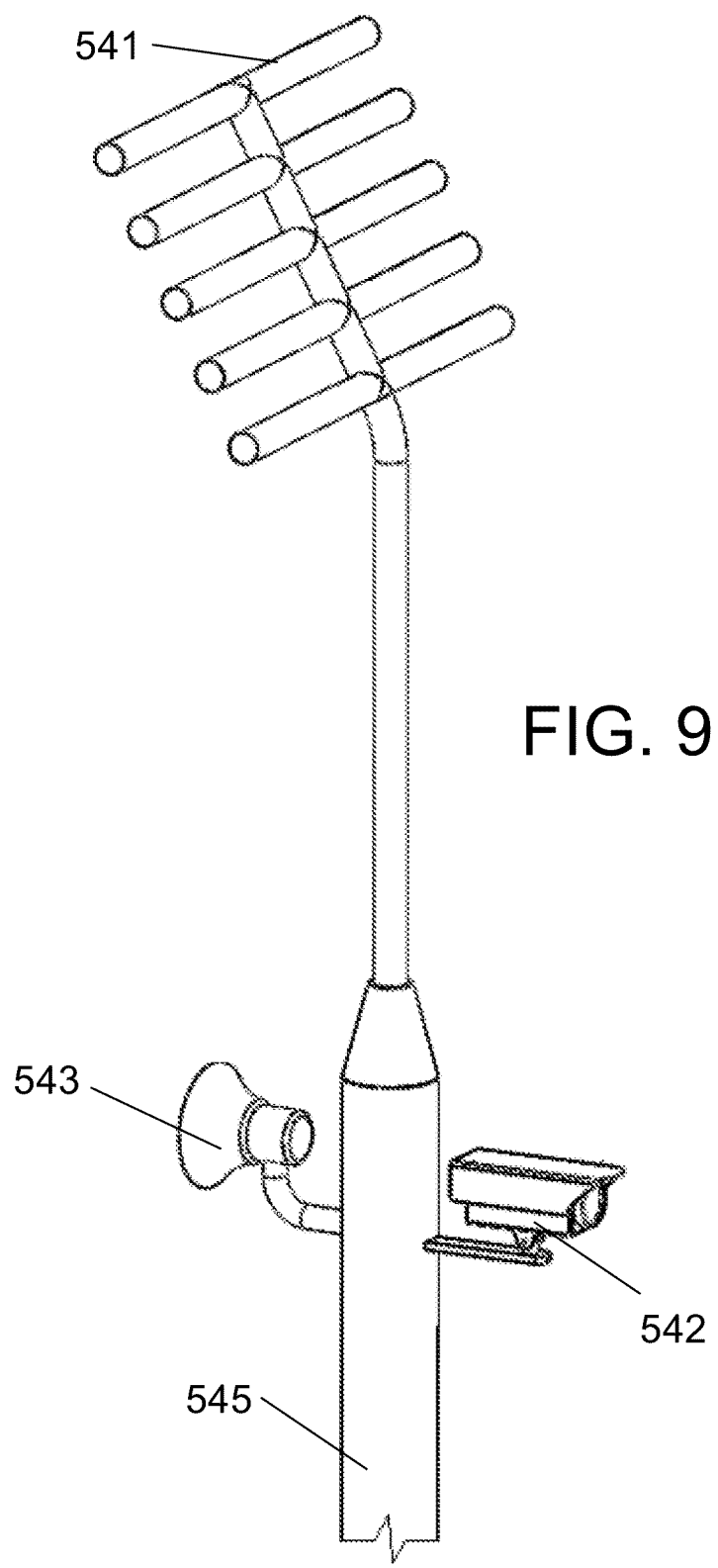
FIG. 9 illustrates one view the upper end of a control tower of a control system embodiment.
Figure 10:
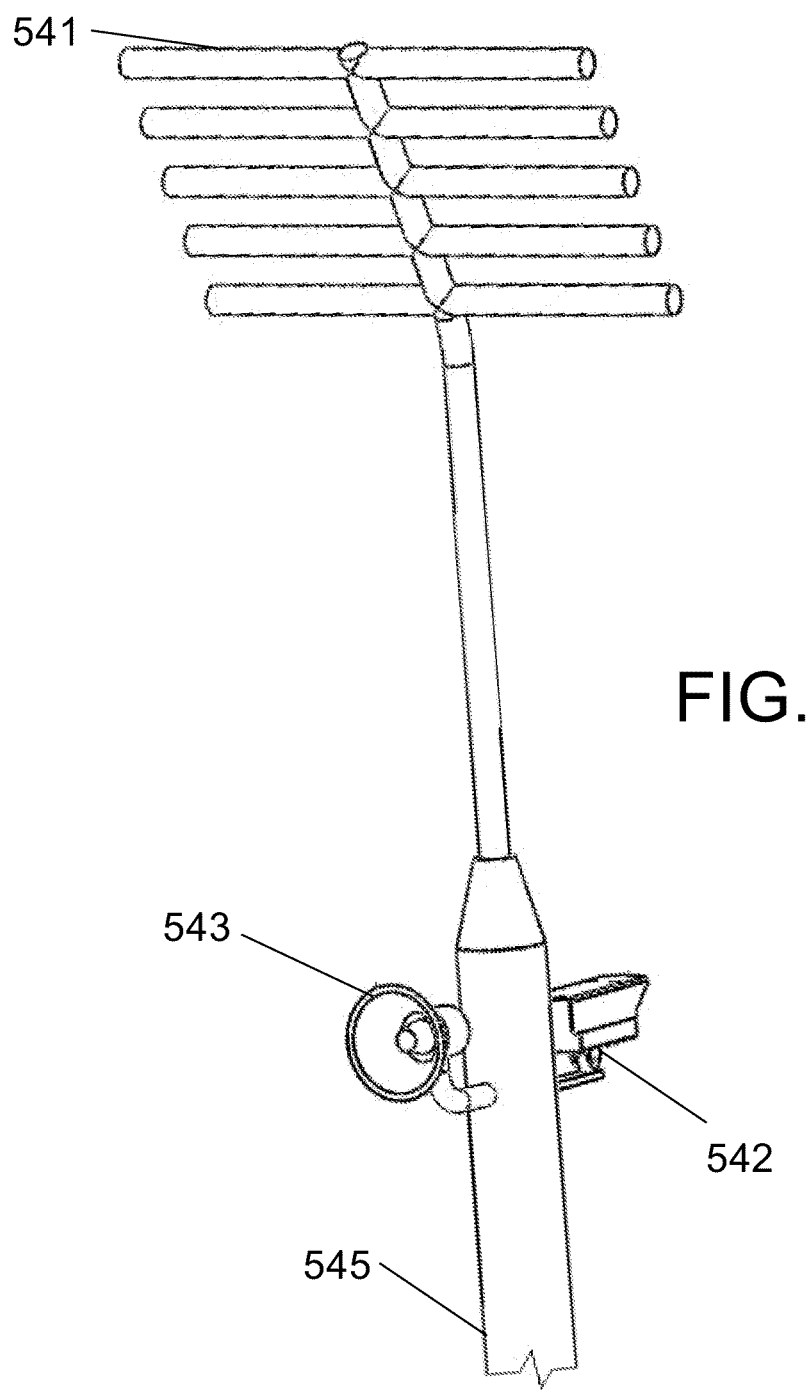
FIG. 10 illustrates another view the upper end of a control tower of a control system embodiment.

Control system embodiments for monitoring and actuation of trap structure may include a control tower 545. The control tower 545 is illustrated in FIGS. 8, 9 and 10. Additionally, the monitoring and actuation systems may include a control box 544, optionally one or more cameras 542, optionally one or more speakers 543, one or more sensors 170 (shown in FIG. 12) and antenna 541. The control systems described herein may transmit data (e.g., in real-time, on demand, intermittently, etc.) from the one or more sensors 170, and, possibly, camera 542, for example, to a computing device (e.g., remote computing device, mobile computing device, local computing device, etc.) through the antenna 541 communicating with a network (e.g., cellular, satellite, etc.). It may be advantageous for control systems to utilize motion sensors, which in-turn trigger alert data transmissions in response to animal presence. Data captured by the one or more sensors 170 and optionally camera 542 can be observed and be used as the basis of control inputs to be sent to the control system. Once the control inputs are processed by the system, outputs may be generated by and sent from control box 544 to optional speaker 543 or electromechanical latch 521. For example, if un-targeted animals are observed by the control system, a frightening sound can be played through speaker 543, scaring away unwanted animals. Conversely, if the target animals do not a arrive in a standard time, a comforting or enticing sound can be played through the speaker 543. Sounds may include, but are not limited to, calls from animals of the same species. These calls can bring the targeted animals into a point that the consumables placed inside the containment become effectively enticing. All or at least some of the trapping protocols described herein may be executed based off data relayed by a control system.

Figure 11:
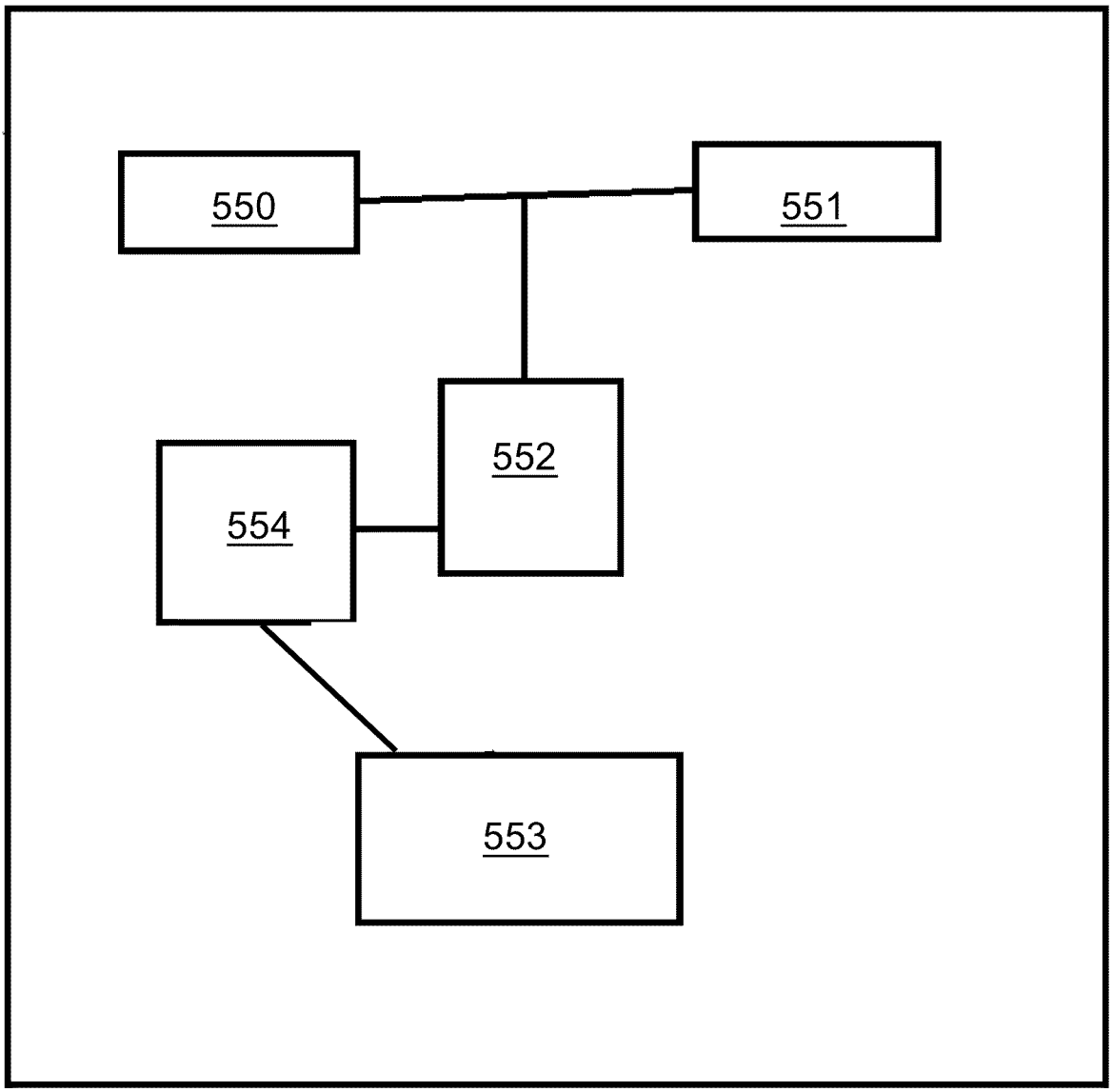
FIG. 11 illustrates an embodiment of a control system for a remote trap monitoring and actuation system.

FIG. 11 illustrates a control box 544 housing an optional signal booster 550, an optional communication device 551 configured to transmit and receive data over a network (e.g., network router, modem, etc.), a processor 552, a power source 553 and, optionally, a voltage regulator 554. The optional signal booster 550 amplifies weak cell service when needed. The communication device 551 connects multiple networks and forwards data packets to computing devices or the processor 552. The processor 552 receives data that is processed and in turn generates corresponding outputs to the system for control. The processor 552 communicates with the communication device 551, the electromechanical latch(s) 21, the one or more sensors 170 (shown in FIG. 12), the optional camera(s) 542, and the optional speaker 543. The power source 553 may be responsible for powering electronics in the control system and, in some embodiments, can be recharged by a solar array and protected by a solar controller. Other recharging systems are also contemplated herein, such as wind turbines, using rechargeable batteries, and the like. If the input voltage of any of the electronics is lower than the power source 553 voltage, the voltage regulator 554 can be used to adjust voltage to the proper level.

Trap structures may be designed in such a way that they can unfold from a trailer for quicker and easier transportation and assembly. In addition, the control tower 545 can be installed on trailer and erectable, in which it can be laid down and fastened for transportation and erected during assembly. The trailer may contain water storage as well as other storage for consumables used in the invention.

Figure 12:
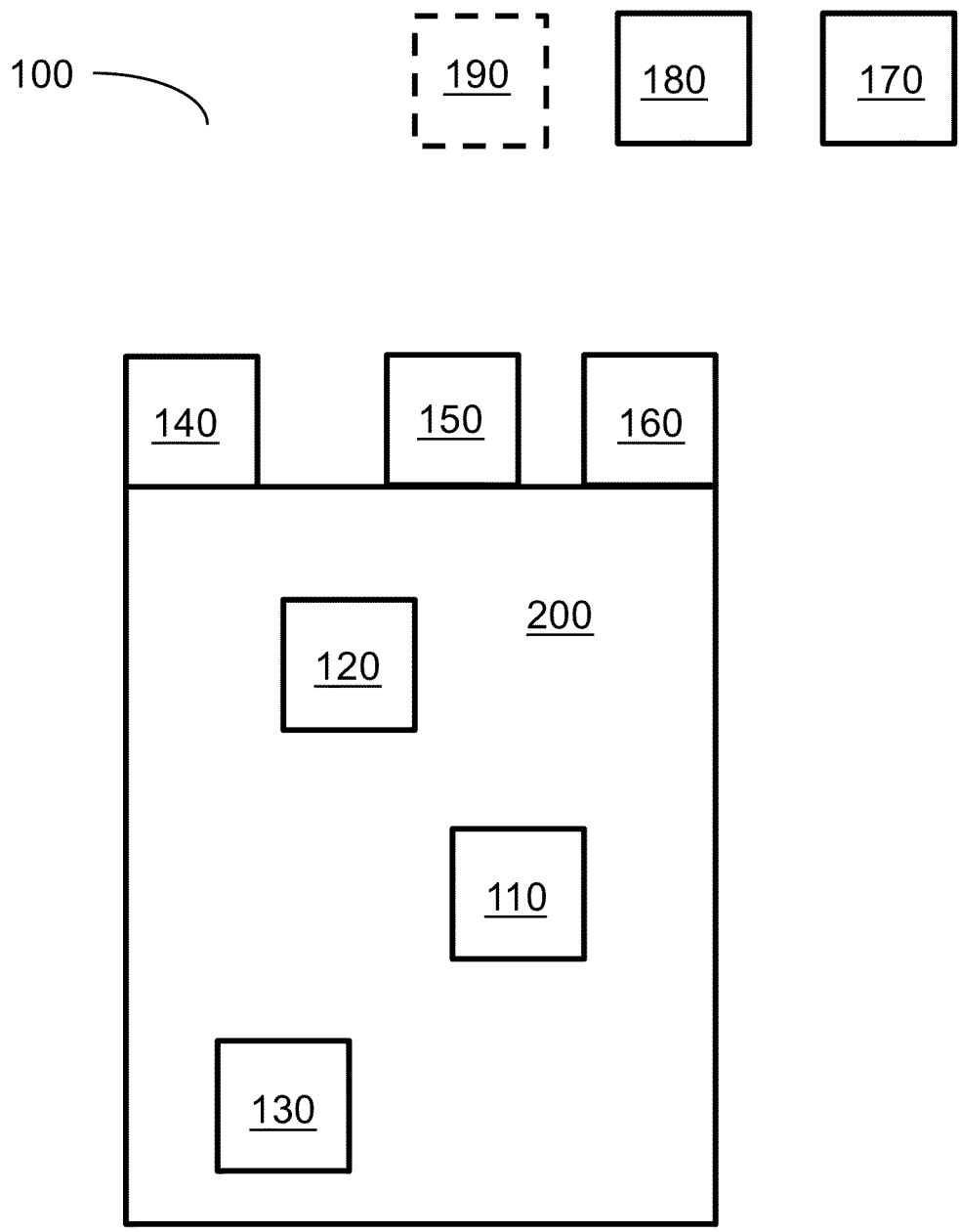
FIG. 12 illustrates an embodiment of a control system for a remote trap monitoring and actuation system.

FIG. 12 illustrates an embodiment of a control system 100 that may be used for a remote trap structure monitoring and actuation. The system 100 includes a processor 110, optionally a communication device 120 configured to transmit and receive data over a network (e.g., network router, modem, etc.), a power source 130, optionally one or more solar panels 140, optionally an antenna 150, optionally one or more cameras 160, one or more motion sensors 170, optionally one or more electromechanical latches 180, and, optionally, one or more auxiliary sensors 190 (e.g., light sensors, temperature sensors, pressure sensors, etc.). Further, the system 100 may include a containment 200 to house, at least, the processor 110 and the communication device 120. The containment 200 may be watertight and provide mechanical protection for components inside. The elements of the system 100 may be communicatively coupled (i.e., wired, or wirelessly) together for the communication of power, data, and/or signals. Power for the elements of system 100, such as the processor 110, the communication device 120, the optional one or more cameras 160, and, in some implementations, the one or more motion sensors 170, and one or more electromechanical latches 180, may be supplied by a power source 130 including one or more batteries. The one or more batteries may be recharged by the one or more solar panels 140, a wind turbine, hydroelectric power, or the like. The communication device 120 may be a cellular router transmitting and receiving via the antenna 150. Alternatively, the communication device 120 may be a WiFi® router transmitting and receiving to a from a satellite to provide a WiFi® coverage area in proximity to the communication device 120. As such, the processor 110 can send and receive instructions, signals, and/or data (e.g., video from the one or more cameras 160, signal from the one or more motion sensors 170) via internet.

The control system 100 embodiment of FIG. 12 may monitor conditions near or in an associated trap structure pertinent to actuation determinations. For example, the one or more cameras 160 may be oriented to record the area near or in an associated trap structure. The one or more motion sensors 170 may be arranged in such a way, or of a variety (e.g., a dual beam infrared sensor), to reliably indicate the presence of an animal and a direction of travel of the animal. For example, the one or more motion sensors 170 may be an infrared sensor, more specifically, including an infrared transmitter and receiver aligned with one another. Infrared sensors provide a signal when the infrared beam from the transmitter is interrupted at the receiver (i.e., something crossing between the transmitter and receiver). Using two or more infrared sensors can indicate the direction in which the beam was broken. For example, if two infrared beams are generated and received (e.g., parallel to each other along a horizontal plane with respect to the ground), the order in which the respective beams are interrupted indicates the direction the object (i.e., animal) is traveling. Additionally, infrared sensors placed near each other, or dual beam infrared sensors, provide selective signal generation or signal filtering. Said another way, if a signal does not match a predefined pattern within a predefined threshold (e.g., a time threshold between a predefined order of beam interruptions), the signal may not be sent to from the motion sensor 170 to the processor 110 or may be filtered by the programmable logic of the processor 110. Selective signal generation and signal filtering reduce unwanted actions from the system 100. For example, some control system 100 embodiments include a processor 110, with associated programmable logic, that can transmit notification instructions to a computing device (e.g., a smart phone) upon receiving a predefined signal. Through practice, it has been found that unbiased processing of motion sensor 170 signals, in most cases, generates large amounts of notification events (i.e., transmission of notification instructions) and, as such, reduces the effectiveness of the monitoring aspect of the control system 100. The described sensors and sensor arrangements greatly increase the monitoring effectiveness of the control system 100 by eliminating notification events for other conditions (rain, sleet, snow, debris, untargeted animals, animals traveling away from or out of the trap structure, etc.). Furthermore, increasingly complex arrangements and associated predefined patterns may be used to further reduce notification events. For example, a predefined pattern may include arranging two or more pairs of infrared beams (i.e., a pair of infrared sensors, or a dual beam infrared sensor) in or near a trap structure, in such a way, that a desired notification event is triggered when the infrared beam pairs are crossed in a predefined order, in a predefined direction, and/or in a predefined amount of time. Further exemplified, and in conjunction with a trap structure embodiment of FIGS. 1-3, if a first pair of infrared beams, acting as a first motion sensor, were set across an outer perimeter 300 gate aperture and a second pair of infrared beams, acting as a second motion sensor, were set across an inner perimeter 310 gate aperture, a notification event may be generated when the first pair of beams are crossed in a direction entering the outer perimeter 300 and the second pair of beams are crossed in a direction entering the inner perimeter 310. Additionally, although exemplified with the trap structure of FIGS. 1-3.

In the control system 100 embodiment shown in FIG. 12, when a notification event is generated, the optional one or more cameras 160 may be instructed to begin recording conditions at the trap structure. Video or images of trap structure conditions may be transmitted to a computing device (e.g., a remote computing device) for confirmation of conditions and actuation determination. For example, when video or images of trap structure conditions indicates the presence of an animal within the trap structure or a portion of the trap structure (e.g., an inner containment 370), an appropriate control input may be transmitted to the control system 100 to close the trap structure or a portion of the trap structure. If the control system 100 receives a transmission with instructions to close a trap or a portion of a trap, the processor 110 may process the transmission and create an output to actuate one or more of the one or more electromechanical latches 180. Actuation of an electromechanical latch 180 allows the closure of a corresponding gate. The corresponding gate may be biased to the closed position by springs (e.g., compression, tension, torsion, etc.), gravity (e.g., falls shut after the electromechanical latch 180 releases the gate), or pneumatic/hydraulic pressure. Some embodiments of the control system 100 include actuators (e.g., linear actuators) in place of the electromechanical latches. Alternative system embodiments without cameras may actuate closure of one or more trap containment systems autonomously based on conditions measured at the trap structure that are defined by a predefined pattern stored in memory and executable by the programmable logic of a processor. For example, autonomous closure actuation may be triggered when the infrared beam pairs of the system embodiment are crossed in a predefined order, in a predefined direction, and/or within a predefined amount of time. Further, embodiments utilizing linear actuators can be used to open or close gates as known in the art based on control outputs from the control system 100. For example, a trap structure with multiple containments and gates provide an opportunity for animal subjects to be organized remotely with a control system 100 utilizing linear actuators to open and close gates depending on one or both of: video or images of trap structure conditions or received sensor data. Exemplified further, if an animal or animals are within a multiple containment trap structure, gates can be opened and remain open until the animal or animals travel into a desired containment (confirmed by sensor readings and/or optional video or image) of the trap, at which point a gate or gate can be closed by the linear actuator. The ability of linear actuators to repeatedly open and close allows the aforementioned process to be repeated.

The control system 100 embodiment of FIG. 12 may be used for the trap structure embodiment of FIGS. 1-6B, or any other suitable trap structure known in the art. For example, it may be advantageous to use the control system 100 on a permanent trap structure (e.g., a corral) that is present in an area desired to be trapped. Further, gates for trap structures may be retrofitted with elements (springs, pneumatics/hydraulics, etc.) to provide a bias force towards a closed position, or a control system 100 utilizing actuators in place of the electromechanical latches 180 may be used. Control system embodiments may be transferred within a trailer and deployed from the trailer.

Motion sensors described herein have been described as the infrared variety, but other varieties of sensors may be adapted for use in the same manner. Example sensor varieties include, microwave, ultrasonic, etc. Additionally, these sensor varieties may be used in conjunction with one another to further refine the appropriateness of notification events. Embodiments of the control system 100 shown in FIG. 12 have been contemplated herein to include video image or image processing in place of, in conjunction, or alternatively with the one or more motion sensors 170, to recognize animal presence and/or animal travel direction. The processor 110 may use video processing algorithms to identify and track animal subjects in or near a trap structure. When conditions within the threshold of one or more predefined patterns exist (based on video, images, sensor data, etc.), the processor 110 may generate a notification event or, autonomously generate trap actuation (e.g., electromechanical latch 180 actuation).

Although embodiments of control systems for monitoring and activation of trap structures have been described with one or more batteries acting as a power source, any appropriate power source known in the art may be utilized by the system. For example, control system embodiments may be powered by an electrical grid, internal combustion generators, solar power, wind power, hydroelectric power, or any combination thereof. Further exemplified, the one or more batteries described may be recharged by solar power, wind power, internal combustion generators, or any combination thereof.

Methods

Figure 13:
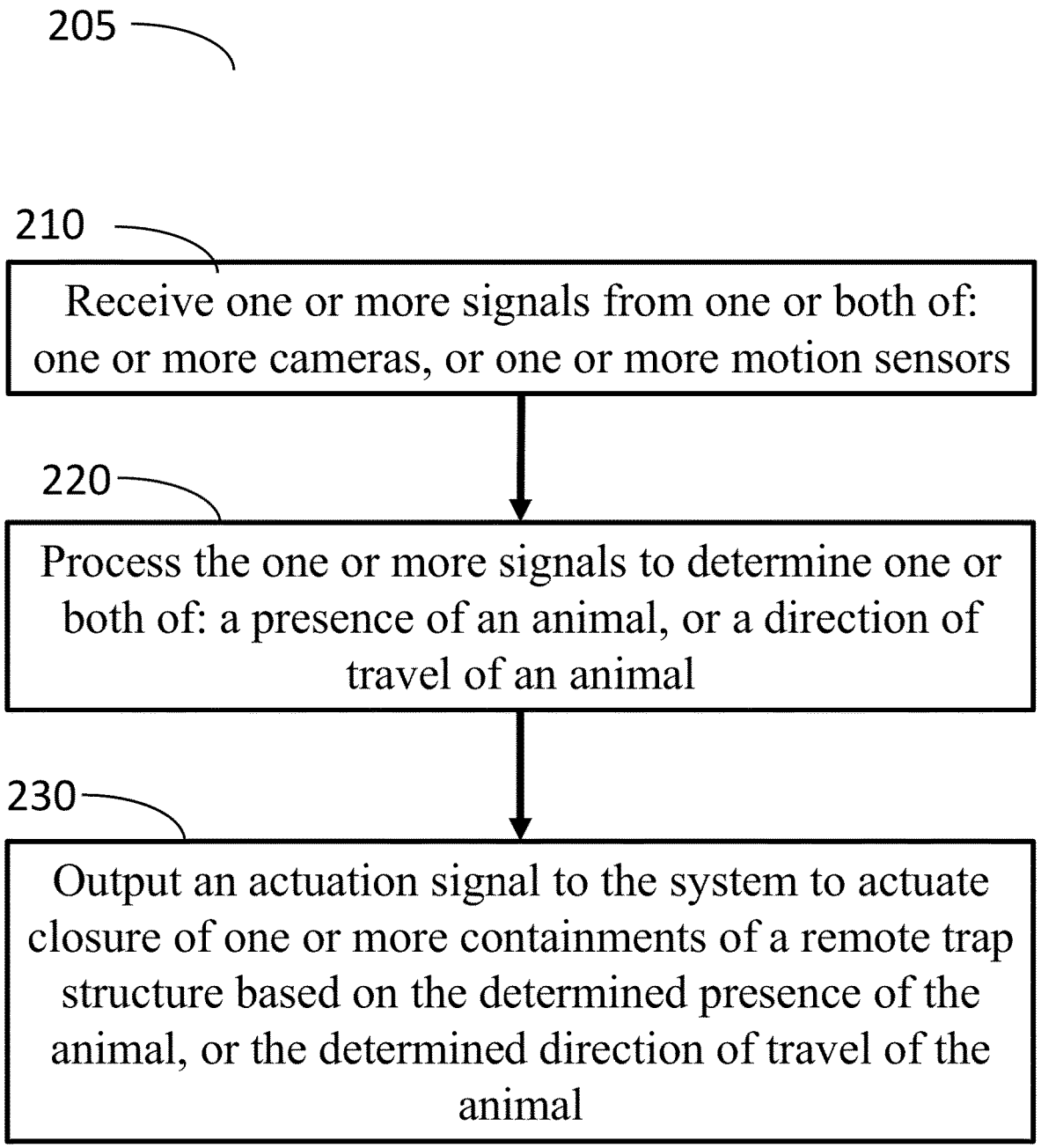
FIG. 13 illustrates a method of for remotely monitoring and actuating a trap structure.

As shown in FIG. 13, an embodiment of a method 205 for remotely monitoring and actuating a trap structure includes receiving one or more signals from one or both of: one or more cameras, or one or more motion sensors in block 210; processing the one or more signals to determine on or both of: a presence of an animal or a direction of travel of an animal in block 220; and outputting an actuation signal to the system to actuate closure of one or more containments of a remote trap structure based on the determined direction of travel of the animal or the determine presence of the animal in block 230. The method 205 functions to identify one or more conditions that may result in the capture of a target animal or animals. In some embodiments, the method 205 functions to generate notification events to encourage monitoring of trap structure conditions and control inputs from a computing device to actuate closure of one or more containments of a trap structure. Other embodiments of the method 205 function to actuate closure of one or more trap containments of a trap structure autonomously based on conditions measured at the trap structure that are defined by one or more predefined patterns stored in memory and executable by the programmable logic of a processor. The method can be configured and/or adapted to function for any suitable trapping of animal subjects. The method 205 may be computer-implemented.

As shown in FIG. 13, an embodiment of a method 205 for remotely monitoring and actuating a trap structure includes block 210, which recites receiving one or more signals from one or both of: one or more cameras, or one or more motion sensors. Block 210 functions to receive camera and/or sensor data at a trap structure to monitor conditions at the trap structure. In some embodiments, the data from the one or more cameras and/or one or more sensors may indicate that no action is needed (e.g., no target animals are present). In some embodiments, the data from the one or more cameras and/or one or more sensors may indicate that one or more target animals are present, traveling in a predefined direction, or in a predefined location of the trap structure.

As shown in FIG. 13, an embodiment of a method 205 for remotely monitoring and actuating a trap structure includes block 220, which recites processing the one or more signals to determine one or both of: a presence of an animal or a direction of travel of an animal. Block 220 preferably functions to process the signals to identify the presence and/or direction of travel of an animal. The presence and/or direction of travel of an animal may be identified with the motion sensors 170 and/or the one or more cameras 160 as described in connection with FIG. 12.

As shown in FIG. 13, an embodiment of a method 205 for remotely monitoring and actuating a trap structure includes block 230, which recites outputting an actuation signal to the system to actuate closure of one or more containments of a remote trap structure based on the determined presence of the animal, or the determined direction of travel of the animal. Block 230 functions to output an actuation signal to actuate closure of one or more containments of a remote trap structure if certain trap structure conditions exist.

In some embodiments, the method further includes transmitting notification instructions to a computing device. The notification instructions may include instructions causing the computing device to generate an auditory, tactile, and/or visual alert indicating that certain conditions exist at the trap structure (e.g., an animal is present, an animal is within a predefined area of the trap structure, etc.). In some embodiments, the method further includes receiving an input, from the computing device, in response to the transmitted notification. The input may include instructions or signals to generate an output of an actuation signal to actuate closure of one or more containments of a remote trap structure, produce audio from one or more speakers, etc.

In some embodiments, the method further includes delaying a predefined period of time between a determination of a presence of an animal and/or a direction of travel and an actuation event. For example, if an animal presence and a predefined direction of travel are determined, an actuation signal to actuate closure of one or more containments of a remote trap structure may be generated after a pre-determined amount of time (e.g., 10 seconds, 10 minutes, 1 hour, etc.).

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor on the control system and/or computing device. The computer-readable medium can be stored on any suitable computer-readable media such as RAMs, ROMs, flash memory, EEPROMs, optical devices (e.g., CD or DVD), hard drives, floppy drives, or any suitable device. The computer-executable component is preferably a general or application-specific processor, but any suitable dedicated hardware or hardware/firmware combination can alternatively or additionally execute the instructions.

References in the specification to "one embodiment," "an embodiment," "an illustrative embodiment," "some embodiments," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As used in the description and claims, the singular form "a", "an" and "the" include both singular and plural references unless the context clearly dictates otherwise. For example, the term "containment" may include, and is contemplated to include, a plurality of containments. At times, the claims and disclosure may include terms such as "a plurality," "one or more," or "at least one;" however, the absence of such terms is not intended to mean, and should not be interpreted to mean, that a plurality is not conceived.

The term "about" or "approximately," when used before a numerical designation or range (e.g., to define a length or pressure), indicates approximations which may vary by (+) or (−) 5%, 1% or 0.1%. All numerical ranges provided herein are inclusive of the stated start and end numbers. The term "substantially" indicates mostly (i.e., greater than 50%) or essentially all of a device, substance, or composition.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed disclosure. "Consisting of" shall mean that the devices, systems, and methods include the recited elements and exclude anything more than a trivial or inconsequential element or step. Embodiments defined by each of these transitional terms are within the scope of this disclosure.

The examples and illustrations included herein show, by way of illustration and not of limitation, specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A remote trap monitoring and actuation system, comprising:
   a power source;
   one or more motion sensors; and
   a processor and a memory configured to store instructions, wherein the processor is communicatively coupled to the memory, the power source, and the one or more motion sensors, wherein the instructions, when executed by the processor, cause the processor to;

receive one or more signals, from the one or more motion sensors, process the one or more signals to determine one or both of: a presence of an animal, or a direction of travel of the animal, and output an actuation signal to actuate closure of one or more containments of a trap structure based on one or both of: the determined presence of the animal, or the determined direction of travel of the animal, wherein the trap structure includes a first plurality of panels defining an outer containment and a second plurality of panels defining an inner containment that is independent of the outer containment.

2. The system of claim 1, further comprising:

an antenna; and a communication device.

3. The system of claim 2, wherein the instructions, when executed by the processor, cause the processor to transmit the instructions to a computing device and process instructions received from the computing device.

4. The system of claim 3, wherein the instructions, when executed by the processor, cause the processor to transmit notification instructions to the computing device upon processing signals from the one or more motion sensors indicative of one or both of: the presence of the animal, or a predefined direction of travel of the animal.

5. The system of claim 2, further comprising an erectable tower, wherein the antenna is coupled to the erectable tower.

6. The system of claim 1, further comprising a trailer, wherein the system is transferred within the trailer and deployed from the trailer.

7. The system of claim 1, further comprising one or more electromechanical latches, wherein the one or more electromechanical latches are configured to be installed on one or more respective gate apertures of a containment structure, wherein:

in an unactuated state, the one or more electromechanical latches are configured to hold a respective gate open, biased towards a closed position, and in an actuated state, the one or more electromechanical latches are configured to release the respective gate, allowing the respective gate to travel to the closed position.

8. The system of claim 1, wherein the one or more motions sensors comprise a first motion sensor and a second motion sensor, wherein the first motion sensor is configured to be installed near or on a first gate aperture of a containment structure and the second motion sensor is configured to be installed near or on a second gate of the containment structure.

9. The system of claim 1, wherein the one or more motion sensors comprise a first pair of motion sensors and a second pair of motion sensor, wherein the first pair of motion sensors are configured to be installed near or across a first gate aperture of a containment structure and the second pair of motion sensors are configured to be installed near or across a second gate aperture of the containment structure.

10. The system of claim 1, further comprising the trap structure that comprises:

the first plurality of panels configured to define an outer perimeter and the outer containment, wherein the first plurality of panels comprises a first gate; and the second plurality of panels configured to define an inner perimeter and the inner containment, wherein the inner perimeter comprises a second gate, wherein the first gate and the second gate are configured to be activated to move between an open position and a closed position, and wherein, when the first gate and the second gate are activated to the closed position, the second plurality of panels do not contact the first plurality of panels.

11. A computer-implemented method of remotely monitoring and actuating a trap structure, comprising:

receiving one or more signals from one or both of: one or more cameras, or one or more motion sensors;

processing the one or more signals to determine one or both of: a presence of an animal or a direction of travel of an animal; and outputting an actuation signal to actuate closure of one or more containments of the trap structure based on one or both of the determined presence of the animal or the determined direction of travel of the animal, wherein the trap structure includes a first plurality of panels defining an outer containment and a second plurality of panels defining an inner containment that is independent of the outer containment.

12. The method of claim 11, further comprising transmitting notification instructions to a computing device.

13. The method of claim 12, further comprising receiving an input, from the computing device, in response to the transmitted notification.

14. The method of claim 11, further comprising delaying for a predefined period of time between one or both of: the determination the presence of the animal or the determination of the direction of travel, and the outputting the actuation signal to actuate closure of the one or more containments of the trap structure.

15. The method of claim 11, wherein the animal includes a target animal.

16. The method of claim 15, wherein the processing of the one or more signals includes utilizing a video processing algorithm to identify and track the target animal.

17. The method of claim 11, further comprising:

when an un-targeted animal is observed from the one or more signals, playing a sound to scare away the un-targeted animal.

18. The method of claim 15, further comprising:

when the target animal is not observed from the one or more signals within a predetermined time, playing a sound to entice the target animal to the trap structure.

\* \* \* \* \*